United States Patent
Warren, Jr.

(10) Patent No.: US 8,024,490 B2
(45) Date of Patent: Sep. 20, 2011

(54) METHOD AND SYSTEM FOR GENERIC DATA TRANSFER INTERFACE

(75) Inventor: Robert W. Warren, Jr., Loveland, CO (US)

(73) Assignee: Seagate Technology LLC, Cupertino, CA (US)

( * ) Notice: Subject to any disclaimer, the term of this patent is extended or adjusted under 35 U.S.C. 154(b) by 1510 days.

(21) Appl. No.: 10/767,505

(22) Filed: Jan. 28, 2004

(65) Prior Publication Data

US 2005/0165971 A1  Jul. 28, 2005

(51) Int. Cl.
*G06F 3/00* (2006.01)
(52) U.S. Cl. .............................................. 710/8; 710/11
(58) Field of Classification Search ................ 710/8, 11, 710/14, 62, 63, 64, 72, 74, 100, 105, 106, 710/305, 306, 313, 315
See application file for complete search history.

(56) References Cited

U.S. PATENT DOCUMENTS

| | | | |
|---|---|---|---|
| 4,805,090 A | 2/1989 | Coogan | |
| 4,811,278 A | 3/1989 | Bean | |
| 4,811,279 A | 3/1989 | Bean | |
| 4,825,406 A | 4/1989 | Bean | |
| 4,837,675 A | 6/1989 | Bean | |
| 5,150,465 A | 9/1992 | Bush | |
| 5,511,169 A * | 4/1996 | Suda | 710/100 |
| 5,644,712 A * | 7/1997 | Coscarella et al. | 710/9 |
| 5,790,811 A * | 8/1998 | Hewitt | 710/105 |
| 6,073,218 A * | 6/2000 | DeKoning et al. | 711/150 |
| 6,725,297 B1 * | 4/2004 | Askar et al. | 710/52 |
| 6,763,405 B2 * | 7/2004 | Sardo et al. | 710/57 |
| 6,912,606 B2 * | 6/2005 | Fay | 710/64 |
| 6,976,116 B2 * | 12/2005 | Aruga | 710/316 |
| 2002/0169960 A1 * | 11/2002 | Iguchi et al. | 713/174 |
| 2003/0088638 A1 * | 5/2003 | Gluck et al. | 709/217 |
| 2004/0037292 A1 * | 2/2004 | Gulati et al. | 370/395.5 |
| 2005/0021890 A1 * | 1/2005 | Baker et al. | 710/62 |
| 2005/0108502 A1 * | 5/2005 | Sandstrom | 712/1 |
| 2005/0165971 A1 * | 7/2005 | Warren | 710/1 |

* cited by examiner

*Primary Examiner* — Alford Kindred
*Assistant Examiner* — David Martinez
(74) *Attorney, Agent, or Firm* — David K. Lucente

(57) ABSTRACT

According to one embodiment of the present invention, a data storage device comprises a generic host interface and a media controller. The host interface has a channel select bit encoder to assert one or more channel select bits to be decoded by the media controller to indicate one or more virtual channels through which the host interface will communicate with the media controller over a data bus. A virtual channel controller in the host interface establishes a peer-to-peer connection with a virtual channel controller in the media controller based on the virtual channel indicated by the one or more channel select bits. A communication controller in the host interface implements a communication protocol for communication with a host and transfers data to and from the media controller via the peer-to-peer connection based on the communication with the host.

25 Claims, 5 Drawing Sheets

METHOD AND SYSTEM FOR GENERIC DATA TRANSFER INTERFACE

FIELD OF THE INVENTION

This application relates generally to data storage devices and more particularly to a generic data transfer interface for a data storage device.

BACKGROUND OF THE INVENTION

A data storage device such as a magnetic, optical, or magneto-optical drive is typically connected to a host computer or other device through one or more communication paths between the host computer and the data storage device. A microprocessor in the data storages device, by executing instructions stored in memory, generally provides control for the device including control of the communications.

Data is transferred between the host computer and the data storage device by way of an interface, which typically utilizes one of a variety of common protocols for communicating with the host computer. Data to be written to the disc drive is thus passed from the host computer to the interface and then to a read/write channel, which encodes and serializes the data and provides the requisite write current signals to the heads. To retrieve data that has been previously stored in the data storage device, read signals are generated by the heads and provided to the read/write channel, which performs decoding and error detection and correction operations and outputs the retrieved data to the interface for subsequent transfer to the host computer or other device.

Currently, there are several popular interfaces available for use in data storage devices. For example, well known interfaces include Advanced Technology Attachment (ATA), Small Computer System Interface (SCSI), serial versions of both ATA and SCSI, Fiber Channel, Fire Wire, Universal Serial Bus (USB), and others. Each of these interface types cause a data storage device to read and write data on a storage medium of the data storage device in response to commands from the host. However, these interfaces all represent a different protocol and require a slightly different set of commands and operation types. In order to support these different interfaces, a manufacturer of data storage devices must develop interface hardware and software to support each protocol and command set. Therefore, the fact that many different interfaces exist adds to the complexities of developing software and hardware for data storage devices.

Accordingly there is a need for a generic host interface that allows many possible interface types to be used or interchanged with few hardware or software changes. The present invention provides a solution to this and other problems, and offers other advantages over the prior art.

SUMMARY OF THE INVENTION

Against this backdrop the present invention has been developed. According to one embodiment of the present invention, a generic host interface for a data storage device comprises a channel select bit encoder to assert one or more channel select bits. The channel select bits indicate one or more virtual channels through which the host interface will communicate over a data bus. A virtual channel controller establishes a peer-to-peer connection with a media controller of the data storage device based on the virtual channel indicated by the one or more channel select bits and performs address-less transfer of data over the data bus. A communication controller implements a communication protocol for communication with a host and transfers data to and from the media controller via the peer-to-peer connection based on the communication with the host.

According to another embodiment of the present invention, a data storage device media controller comprises a channel select bit decoder to decode one or more channel select bits from a host interface. The channel select bits indicate one or more virtual channels through which the media controller may communicate over a data bus with the host interface. A virtual channel controller establishes a peer-to-peer connection with the host interface based on the virtual channel indicated by the one or more channel select bits and performs address-less transfer of data over the data bus. A communication controller transfers data to and from the host interface via the peer-to-peer connection.

According to yet another embodiment of the present invention, a data storage device comprises a generic host interface and a media controller. The host interface has a channel select bit encoder to assert one or more channel select bits indicating one or more virtual channels through which the host interface will communicate over a data bus. A virtual channel controller in the host interface establishes a peer-to-peer connection based on the virtual channel indicated by the one or more channel select bits and performs address-less transfer of data over the data bus. A communication controller in the host interface implements a communication protocol for communication with a host and transfers data via the peer-to-peer connection based on the communication with the host. The media controller includes a channel select bit decoder to decode the one or more channel select bits from the host interface. A virtual channel controller in the media controller establishes a peer-to-peer connection with the host interface based on the virtual channel indicated by the one or more channel select bits and performs address-less transfer of data over the data bus. A communication controller in the media controller transfers data to and from the host interface via the peer-to-peer connection.

These and various other features as well as advantages which characterize the present invention will be apparent from a reading of the following detailed description and a review of the associated drawings.

DETAILED DESCRIPTION

Embodiments of the present invention will be discussed with reference to a data storage device that, in one embodiment may be a magnetic disc drive such as disc drive 100 illustrated in FIG. 1. One skilled in the art will recognize that the present invention may also be applied to any data storage device, such as an optical disc drive, a magneto-optical disc drive, or other data storage device that may be coupled with a host processor using a specific communication protocol.

Figure 1:
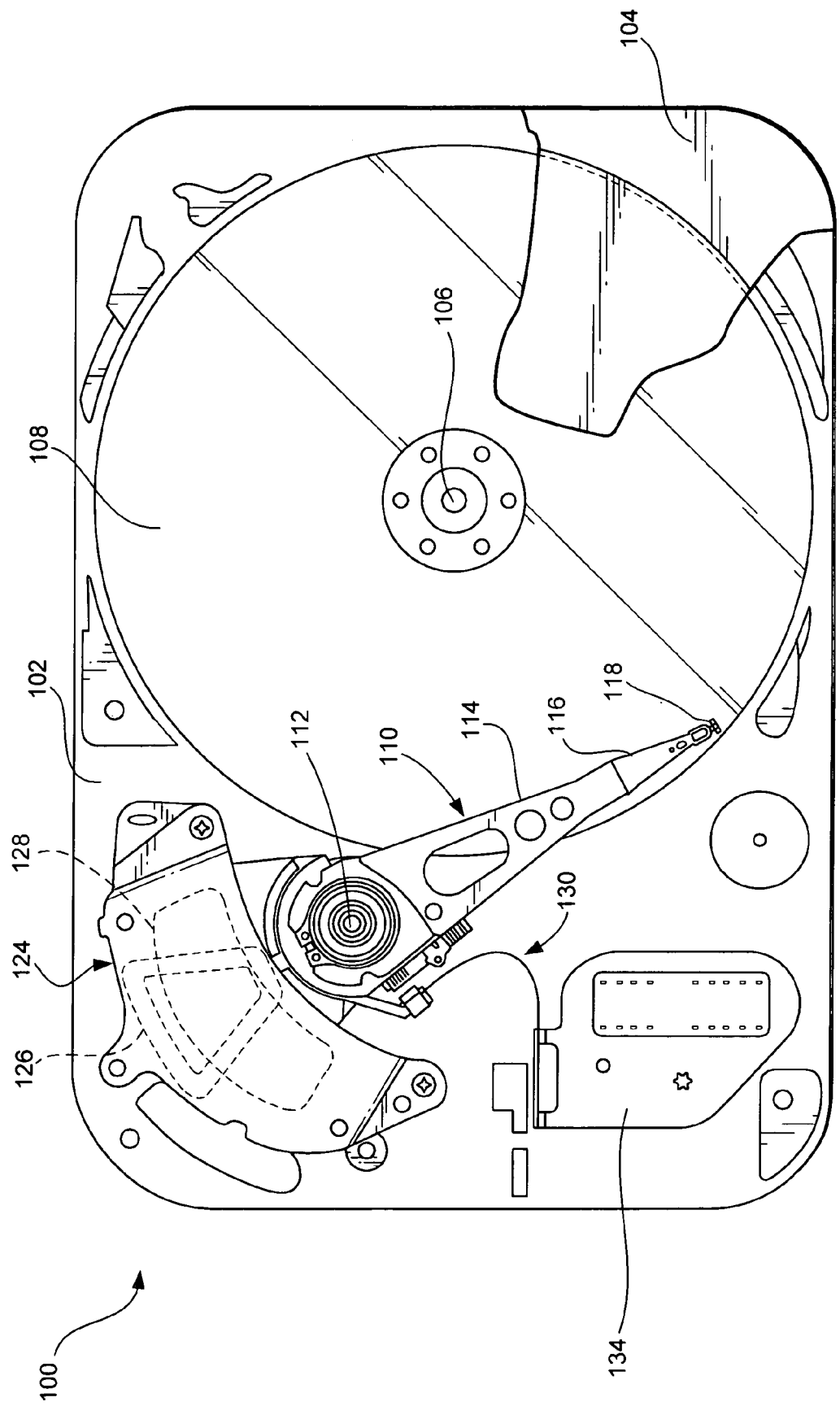
FIG. 1 is a plan view of a disc drive in accordance with an embodiment of the present invention illustrating the primary internal components of the disc drive.

FIG. 1 is a plan view illustrating the primary internal components of a disc drive incorporating one of the various embodiments of the present invention. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a fluid bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved away from portions of the disc 108 containing data when the drive motor is de-energized. The heads 118 are secured over portions of the disc not containing data through the use of an actuator latch arrangement and/or ramp, which prevents inadvertent rotation of the actuator assembly 110 when the drive discs 108 are not spinning.

A flex assembly 130 provides the requisite electrical connection paths for the actuator assembly 110 while allowing pivotal movement of the actuator assembly 110 during operation. The flex assembly includes a printed circuit board 134 to which a flex cable leading to the head is connected; the flex cable leading to the heads 118 being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
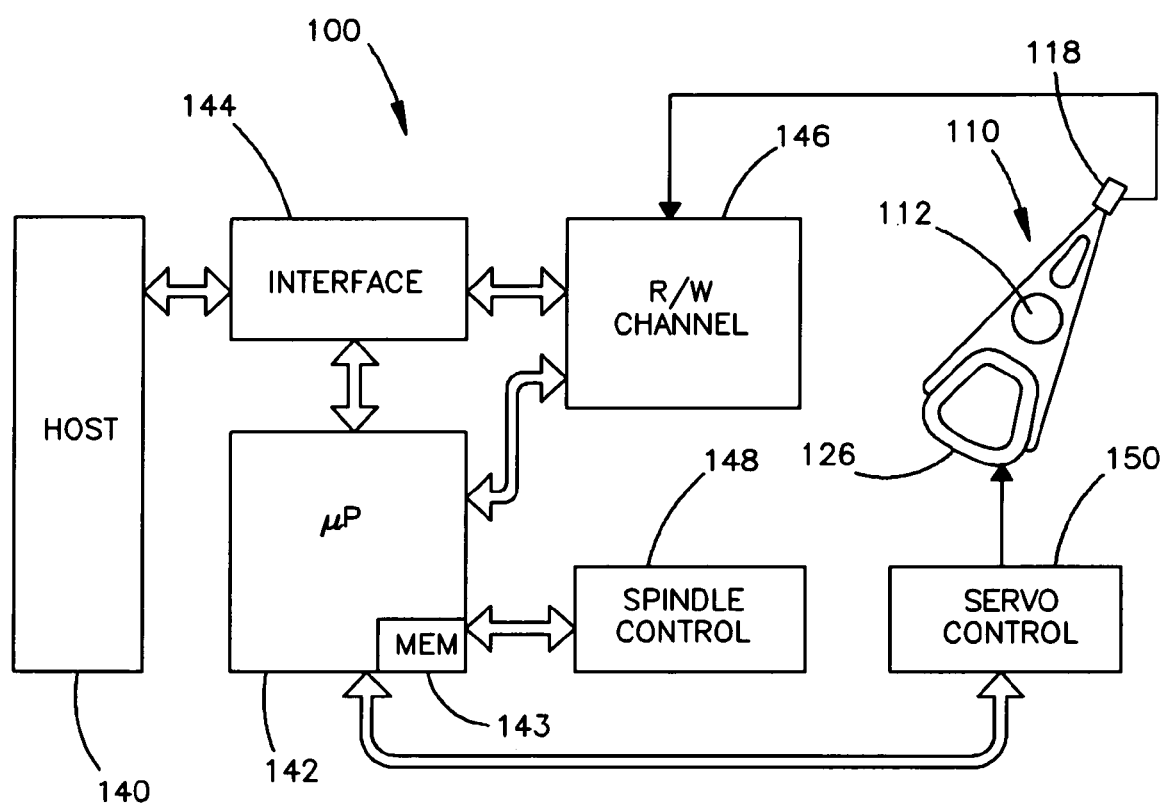
FIG. 2 is a control block diagram for the disc drive shown in FIG. 1 illustrating the primary functional components.

FIG. 2 is a control block diagram for the disc drive 100 illustrating the primary functional components of a disc drive incorporating one of the various embodiments of the present invention and generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142. Instructions stored in MEM 143 and executable by the microprocessor 142 may include instructions for arranging information stored on the disc 108 as will be discussed below with reference to FIGS. 4-8.

The discs 108 are rotated at a constant high speed by a spindle motor control circuit 148, which typically electrically commutates the spindle motor 106 (FIG. 1) through the use, typically, of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high-speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the data storage device 100, read signals are generated by the heads 118 and provided to the read/write channel 146, which performs decoding and error detection and correction operations and outputs the retrieved data to the interface 144 for subsequent transfer to the host computer 140 or other device.

Interface 144 typically utilizes one of a variety of common protocols such as Advanced Technology Attachment (ATA), Small Computer System Interface (SCSI), the serial version of ATA or SCSI, Fiber Channel, Fire Wire, Universal Serial Bus (USB), or others for communicating with the host computer. As will be described below, the interface may also be a generic interface that allows the host computer to use one or more of these common interface types while communicating with the data storage device in a generic manner, independent of host interface type.

Figure 3:
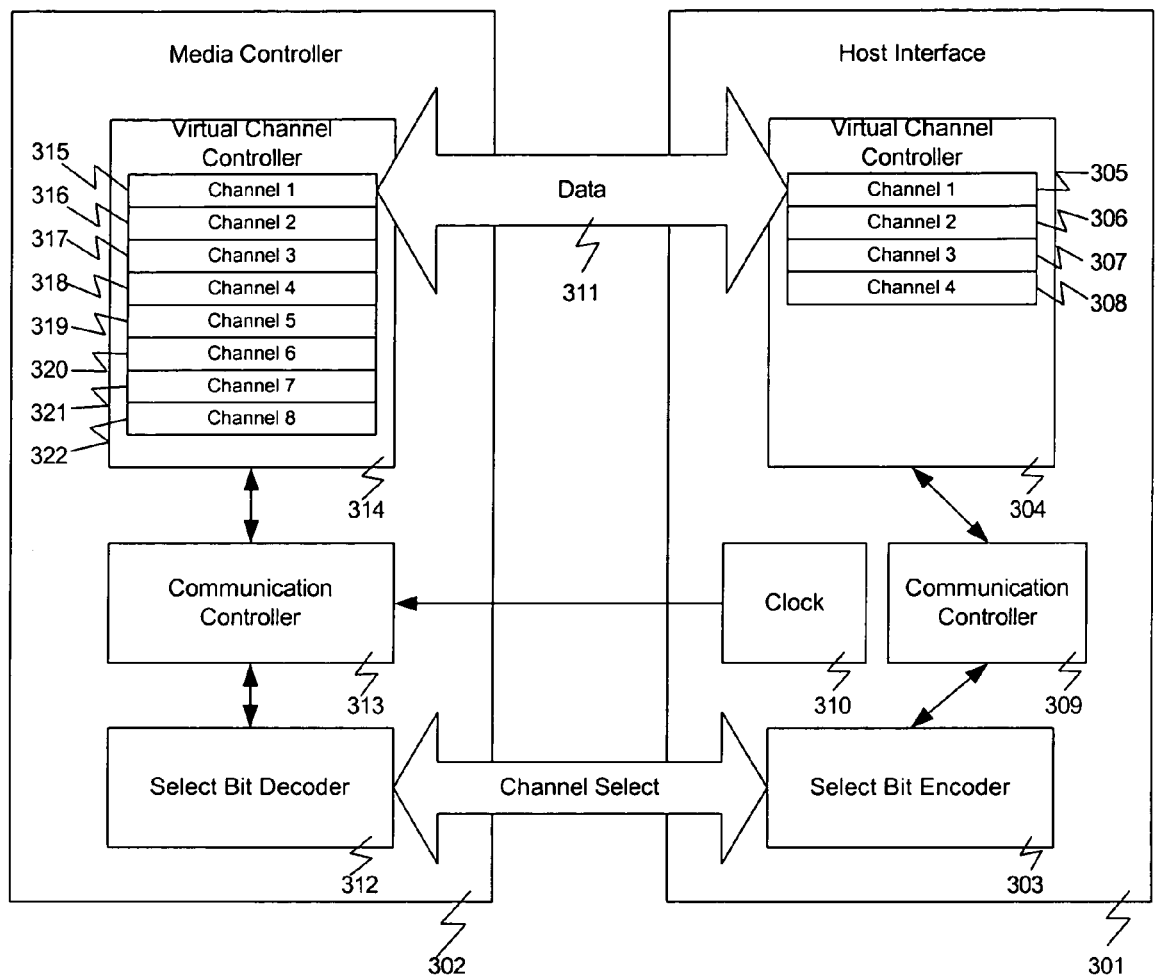
FIG. 3 is a block diagram illustrating components of a generic data transfer interface according to one embodiment of the present invention.

FIG. 3 is a block diagram illustrating components of a generic data transfer interface according to one embodiment of the present invention. This example includes two main components, the host interface 301 and the data storage device media controller 302. It should be noted that, while illustrated together here, these components need not be located in the same device. That is, in one implementation, a data storage device may include both the host interface 301 and the media controller 302. In another implementation, the host interface 301 may be located in another piece of equipment or as a stand-alone component and may be connected with the media controller 302 by cables or other means.

The generic host interface 301 includes a channel select bit encoder 303, a virtual channel controller 304, a communications controller 309, and a clock 310. The channel select bit encoder 303 of the host interface 301 asserts one or more channel select bits indicating one of a number of virtual channels 305-308 through which the host interface 301 will communicate with the media controller 302 over a data bus 311. The number of channel select bits depends on the implementation but will relate to the number of virtual channels used. For example, if eight virtual channels are available, three select bits will likely be used to represent each of the eight channels.

The virtual channel controller 304 of the host interface 301 establishes a peer-to-peer connection with the media controller 302 based on the virtual channel indicated by the one or more channel select bits asserted by the select bit encoder 303. As indicated here, the virtual channel controller may have one or more virtual channels 305-308 available for use. Each of these channels 305-308 may be implemented as a software process or in hardware. As will be seen below, a corresponding virtual channel in the media controller 302 will interact with the process or processor implementing the virtual channel on the host interface 301 to provide the peer-to-peer connection.

Via these peer-to-peer connections, the host interface 301 and media controller 302 may perform address-less transfers of data over the data bus 311. The data transfers are related to and controlled by the processes or processors providing the virtual channel but are unrelated to the interface type used by the host and may therefore be address-less. The data bus itself 311 may be an arbitrary width depending on the implementation.

A communication controller 309 in the host interface 301 implements a communication protocol for communication with a host and transfers data via the peer-to-peer connection with the media controller 302 based on the communication with the host. That is, the host interface 301 provides an interface to the host utilizing any one or more of the common interface types but performs read and write operations via the address-less data transfers over the peer-to-peer connections established through the virtual channels.

The media controller 302 includes a channel select bit decoder 312, a virtual channel controller 314, and a communication controller 313. The channel select bit decoder 312 decodes the one or more channel select bits from the host interface 301.

The virtual channel controller 314 of the media controller 314 establishes a peer-to-peer connection with the host interface 301 based on the virtual channel 315-322 indicated by the one or more channel select bits decoded by the channel select bit decoder 312. As introduced above, each of the virtual channels 315-322 may be implemented as a software process or in hardware. A corresponding virtual channel in the host interface 301 will interact with the process or processor implementing the virtual channel on the media controller 302 to provide the peer-to-peer connection.

The example illustrated in FIG. 3 includes a virtual channel controller 314 in the media controller 302 having eight virtual channels 315-322 while the host interface 302 has a virtual channel controller 304 with four virtual channels 305-308. These numbers are completely arbitrary and, in practice, are implementation specific. Since any given media controller may be coupled with a variety of host interfaces, the media controller may provide virtual channels for a number of different host interfaces. If the host interface, through the channel select bits, correctly identifies which of the virtual channels is to be used for a given transfer, the appropriate peer-to-peer connection can be established for that transfer.

The media controller also includes a communication controller 313 to transfer data to and from the host interface 301 via the peer-to-peer connection. In use, the communication controller 313 can use the peer-to-peer connections established through the virtual channels to perform an address-less transfer of various types of communications. For example, one virtual channel may be used to establish a peer-to-peer connection to transfer read/write data between the host interface and the media controller. Another virtual channel may be used to establish a peer-to-peer connection to transfer control signals between the host interface and the media controller. Yet another virtual channel may be used to establish a peer-to-peer connection to transfer side band information between the host interface and the media controller.

According to one embodiment, the communications between the host interface 301 and the media controller 302 may be performed synchronously. That is, the communication controller 309 of the host interface 301 transfers data to and from the media controller 302 synchronous with a clock 310 in the host controller 301.

As will be explained further below, the communication controller 309 of the host interface 301 may transfers data to and from the media controller 302 based on a quadrature handshake model. That is, the host interface 301 and media controller 302 may exchange a sequence of ready and acknowledgement signals prior to each transfer. Of course, various other arrangements are possible such as no handshaking or a different model.

In some cases, the media controller 302 may limit access to a storage medium of the data storage device through the peer-to-peer connection. For example, the media controller may allow access to only a limited portion of the storage medium for one virtual channel and another portion for another virtual channel. The media controller 302 may, in one embodiment, limit access to the storage medium based on one or more registers relating to each of the one or more virtual channels. In such a case, the registers may indicate a range of addresses on the storage medium that may be accessed via the related virtual channel. In this way, the media controller 302 may enforce some protection for the contents of the storage medium.

The modules illustrated in FIG. 3 may be implemented as software stored in memory, firmware, hardware, or some combination. For example, the select bit encoder/decoder, communication controller and virtual channel controller may all be implemented as one or more software routines executed by a processor. Alternatively, each module may be implemented by one or more specifically designed integrated circuits.

Additionally, it should be understood that the example illustrated in FIG. 3 includes only one media controller and one host interface for simplicity. In some cases, more than one host interface may be used with a single media controller. However, in such a case, arbitration should be performed between the host interfaces to reliably maintain communications on the data bus.

Figure 4:
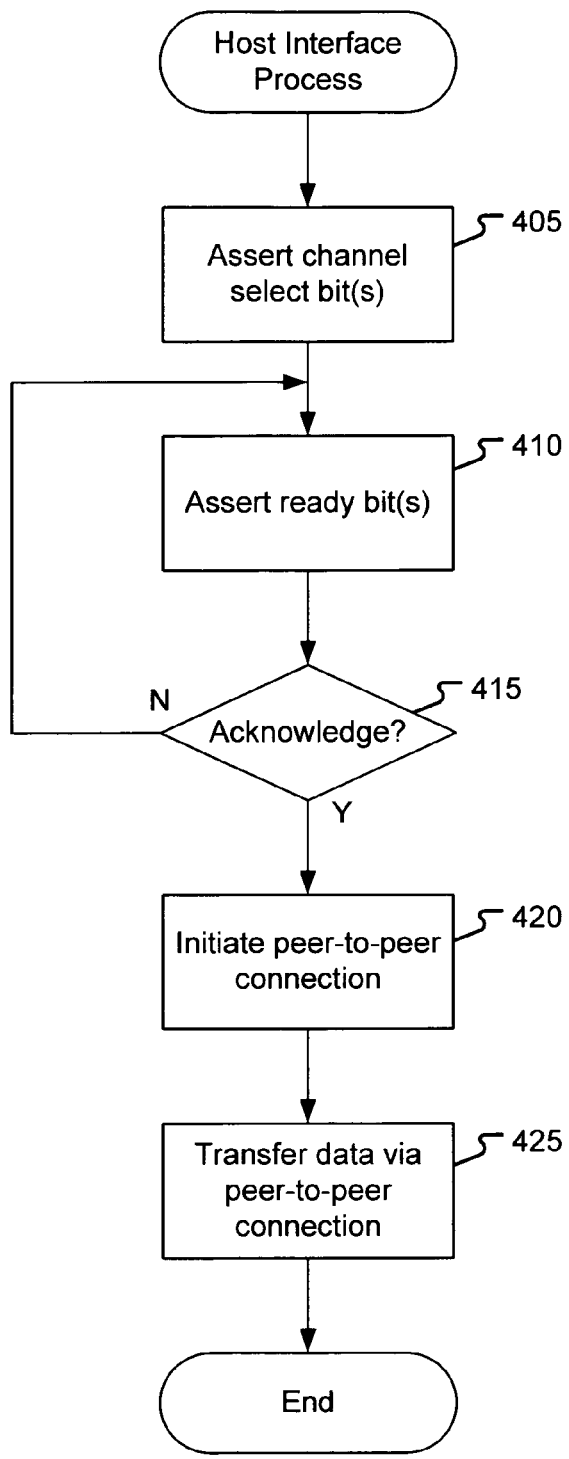
FIG. 4 is a flowchart illustrating host interface processing according to one embodiment of the present invention.

FIG. 4 is a flowchart illustrating host interface processing according to one embodiment of the present invention. In this example, operation begins with assert operation 405. Assert operation 405 comprises asserting one or more channel select bits indicating one or more virtual channels through which the host interface will communicate over a data bus. Control then passes to assert operation 410.

Assert operation 410 comprises asserting one or more ready bits. As explained above, the host interface and media controller may implement a quadrature handshaking model for each communication. If such a model is implemented, the host interface asserts a ready bit through one or more bits that may be read by the media controller. Control then passes to query operation 415.

Query operation 415 comprises determining whether the media controller has acknowledged the ready bit asserted by the host interface. If, at query operation 415, a determination is made that the media controller has not yet acknowledged the ready signal, control pauses at query operation 415 to wait for the acknowledgement. Once the acknowledge signal is detected, control passes to initiate operation 420.

Initiate operation 420 comprises establishing a peer-to-peer connection with the media controller based on the virtual channel indicated by the one or more channel select bits. Control then passes to transfer operation 425.

Transfer operation 425 comprises performing address-less transfer of data over the peer-to-peer connection established between the host interface and media controller.

Figure 5:
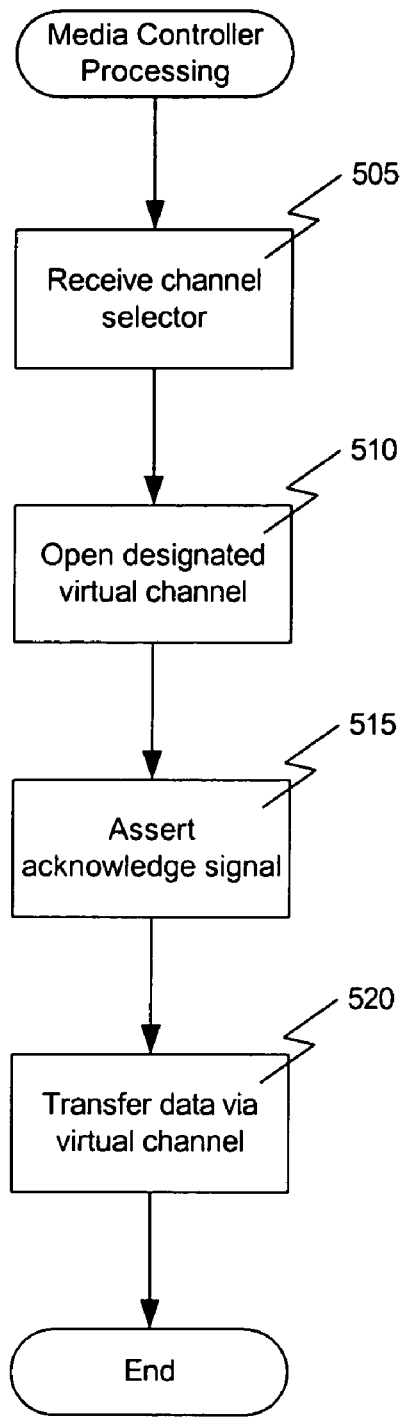
FIG. 5 is a flowchart illustrating media controller processing according to one embodiment of the present invention.

FIG. 5 is a flowchart illustrating media controller processing according to one embodiment of the present invention. Here, processing begins with receive operation 505. Receive operation 505 comprises receiving and decoding one or more channel select bits from the host interface. The one or more channel select bits indicate one or more virtual channels through which the media controller will communicate over the data bus with the host interface. Control the passes to open operation 510.

Open operation 510 comprises establishing a peer-to-peer connection with the host interface based on the virtual channel indicated by the one or more channel select bits. Control then passes to assert operation 515.

Assert operation 515 comprises asserting an acknowledgement signal that may be detected by the host interface. As explained above, the host interface and media controller may implement a quadrature handshaking model for each communication. If such a model is implemented, the media controller asserts an acknowledgement signal through one or more bits that may be read by the media controller. Control the passes to transfer operation 520.

Transfer operation 520 comprises performing an address-less transfer of data over the data bus via the peer-to-peer connection.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, various types of data storage devices may be used in addition to disc drives. Additionally, any number of virtual channels may be used by the media controller and host interface as needed. Numerous other changes may be made which will readily suggest themselves to those skilled in the art and which are encompassed in the spirit of the invention disclosed and as defined in the appended claims.

What is claimed is:

1. A host interface comprising:
   a channel select bit encoder that asserts to a media controller one or more channel select bits indicating one of a plurality of virtual channels through which the host interface will communicate over a data bus with the media controller;
   a virtual channel controller coupled to the channel select bit encoder that establishes a connection for address-less transfer between the indicated virtual channel of the host interface and a corresponding virtual channel of the media controller.

2. The host interface of claim 1, wherein the connection is a peer-to-peer connection and the indicated virtual channel of the host interface and the corresponding virtual channel of the media controller are used to establish the peer-to-peer connection to transfer data between the host interface and the media controller.

3. The host interface of claim 1, wherein the connection is a peer-to-peer connection and the indicated virtual channel of the host interface and the corresponding virtual channel of the media controller are used to establish the peer-to-peer connection to transfer control signals between the host interface and the media controller.

4. The host interface of claim 1, wherein the connection is a peer-to-peer connection and the indicated virtual channel of the host interface and the corresponding virtual channel of the media controller are used to establish the peer-to-peer connection to transfer side band information between the host interface and the media controller.

5. The host interface of claim 1 further comprising:
   a communication controller that transfers data between the host interface and the media controller via address-less transfer.

6. The host interface of claim 5, wherein the communication controller transfers data to and from the media controller synchronous with a clock in the host controller.

7. The host interface of claim 5, wherein the communication controller transfers data to and from the media controller based on a quadrature handshake model.

8. A media controller comprising:
   a channel select bit decoder that decodes one or more channel select bits received from a host interface indicating one of a plurality of virtual channels through which the host interface will communicate over a data bus with the media controller;
   a virtual channel controller coupled to the channel select bit decoder that decodes the one or more channel select bits and establishes a connection for address-less transfer between the indicated virtual channel of the host interface and a corresponding virtual channel of the media controller selected based on the one or more decoded channel select bits.

9. The media controller of claim 8, wherein the connection is a peer-to-peer connection and the indicated virtual channel of the host interface and the corresponding virtual channel of the media controller are used to establish the peer-to-peer connection to transfer data between the host interface and the media controller.

10. The media controller of claim 8, wherein the connection is a peer-to-peer connection and the indicated virtual channel of the host interface and the corresponding virtual channel of the media controller are used to establish the peer-to-peer connection to transfer control signals between the host interface and the media controller.

11. The media controller of claim 8, wherein the connection is a peer-to-peer connection and the indicated virtual channel of the host interface and the corresponding virtual channel of the media controller are used to establish the peer-to-peer connection to transfer side band information between the host interface and the media controller.

12. The media controller of claim 8 further comprising:
   a communication controller that transfers data between the host interface and the media controller via address-less transfer.

13. The media controller of claim 12, wherein the communication controller transfers data to and from the host interface synchronous with a clock in the host interface.

14. The media controller of claim 12, wherein the communication controller transfers data to and from the host interface based on a quadrature handshake model.

15. The media controller of claim 8, wherein the connection is a peer-to-peer connection and the media controller limits access to a storage medium of a data storage device through the peer-to-peer connection.

16. The media controller of claim 15, wherein the media controller limits access to the storage medium based on one or more registers relating to each of the virtual channels of the media controller, the registers indicating a range of addresses on the storage medium that may be accessed via the related virtual channel of the media controller.

17. A data storage device comprising:
- a host interface comprising a channel select bit encoder that asserts one or more channel select bits indicating one of a plurality of virtual channels through which the host interface will communicate over a data bus; and
- a media controller comprising a channel select bit decoder that decodes the one or more channel select bits received from the host interface and a virtual channel controller coupled to the channel select bit decoder that establishes a connection for address-less transfer between the indicated virtual channel of the host interface and a corresponding virtual channel of the media controller selected based on the one or more decoded channel select bits.

18. The data storage device of claim 17, wherein the connection is a peer-to-peer connection and the indicated virtual channel of the host interface and the corresponding virtual channel of the media controller are used to establish the peer-to-peer connection to transfer data between the host interface and the media controller.

19. The data storage device of claim 17, wherein the connection is a peer-to-peer connection and the indicated virtual channel of the host interface and the corresponding virtual channel of the media controller are used to establish the peer-to-peer connection to transfer control signals between the host interface and the media controller.

20. The data storage device of claim 17, wherein the connection is a peer-to-peer connection and the indicated virtual channel of the host interface and the corresponding virtual channel of the media controller are used to establish the peer-to-peer connection to transfer side band information between the host interface and the media controller.

21. The data storage device of claim 17 wherein the host interface further comprises:
- a communication controller that transfers data between the host interface and the media controller via address-less transfer.

22. The data storage device of claim 21, wherein the communication controller of the host interface transfers data to and from the media controller synchronous with a clock in the host controller.

23. The data storage device of claim 21, wherein the communication controller of the host interface transfers data to and from the media controller based on a quadrature handshake model.

24. The data storage device of claim 17, wherein the connection is a peer-to-peer connection and the media controller limits access to a storage medium of the data storage device through the peer-to-peer connection.

25. The data storage device of claim 24, wherein the media controller limits access to the storage medium based on one or more registers relating to each of the virtual channels of the media controller, the registers indicating a range of addresses on the storage medium that may be accessed via the related virtual channel of the media controller.

* * * * *